(12) United States Patent
Ma et al.

(10) Patent No.: US 6,212,322 B1
(45) Date of Patent: Apr. 3, 2001

(54) POSITIVE DISPERSION LOW DISPERSION SLOPE FIBER

(75) Inventors: Daiping Ma; David Kinney Smith, both of Wilmington, NC (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/373,944

(22) Filed: Aug. 13, 1999

Related U.S. Application Data

(60) Provisional application No. 60/130,652, filed on Apr. 23, 1999, provisional application No. 60/103,080, filed on Oct. 5, 1998, and provisional application No. 60/099,979, filed on Sep. 11, 1998.

(51) Int. Cl.[7] .................................................. G02B 6/02
(52) U.S. Cl. ........................... 385/123; 385/124; 385/127
(58) Field of Search .................................... 385/123, 124, 385/127, 125, 126, 128

(56) References Cited

U.S. PATENT DOCUMENTS

| | | | |
|---|---|---|---|
| 4,715,679 | 12/1987 | Bhagavatula | 385/123 |
| 5,684,909 | 11/1997 | Liu | 385/127 |
| 5,721,800 | 2/1998 | Kato et al. | 385/127 |
| 5,748,824 | * 5/1998 | Smith | 385/124 |
| 5,852,701 | 12/1998 | Kato et al. | 385/127 |
| 6,072,929 | 6/2000 | Kato et al. | 385/123 |

FOREIGN PATENT DOCUMENTS

| | | |
|---|---|---|
| 0664464 | 7/1995 | (EP) . |
| 0724171 | 7/1996 | (EP) . |
| 0774676 | 5/1997 | (EP) . |
| 0 799 524 | 6/1997 | (EP) . |
| 0789255 | 8/1997 | (EP) . |
| 10010350 | 1/1998 | (JP) . |

* cited by examiner

*Primary Examiner*—Phan T. H. Palmer
(74) *Attorney, Agent, or Firm*—William J. Chervenak

(57) ABSTRACT

Disclosed is a single mode optical waveguide having a segmented core of at least two segments. The relative refractive index, the index profile and the radial dimensions of the core segments are selected to provide an optical waveguide fiber having properties suitable for a high performance telecommunication system operating in the wavelength window of about 1530 nm to 1570 nm. Embodiments of the invention having two, three and four segments are described.

28 Claims, 3 Drawing Sheets

POSITIVE DISPERSION LOW DISPERSION SLOPE FIBER

CROSS-REFERENCE TO RELATED APPLICATIONS

This application claims the benefit of U.S. Provisional Patent Application No. 60/099,979, filed Sep. 11, 1998 and U.S. Provisional Patent Application No. 60/103,080, filed Oct. 5, 1998 and U.S. Provisional Patent Application No. 60/130,652, filed Apr. 23, 1999.

BACKGROUND OF THE INVENTION

The invention is directed to a single mode optical waveguide fiber, more particularly to a waveguide fiber in which the total dispersion is maintained positive over the entire fiber length. In addition, the effective area is high and total dispersion slope is maintained at a low value.

Because of the high data rates and the need for long regenerator spacing, the search for high performance optical waveguide fibers designed for long distance, high bit rate telecommunications has intensified. An additional requirement is that the waveguide fiber be compatible with optical amplifiers, which typically show an optimum gain curve in the wavelength range 1530 nm to 1570 nm. Consideration is also given to the potential of expanding the usable wavelength into the L-Band range of about 1570 nm to 1700 nm, more preferably in the range of about 1570 nm to 1625 nm.

In cases where waveguide information capacity is increased by means of wavelength division multiplexing (WDM) technology, an additional waveguide fiber property becomes important. For WDM, high bit rate systems, the waveguide should have exceptionally low, but non-zero, total dispersion, thereby limiting the non-linear dispersion effect of four wave mixing.

Another non-linear effect which can produce unacceptable dispersion in systems having a high power density, i.e., a high power per unit area, is self phase modulation. Self phase modulation may be controlled by designing a waveguide core which has a large effective area, thereby reducing the power density. An alternative approach is to control the sign of the total dispersion of the waveguide so that the total dispersion of the waveguide serves to counteract the dispersive effect of self phase modulation.

A waveguide having a positive dispersion, where positive means shorter wavelength signals travel at higher speed than those of longer wavelength, will produce a dispersion effect opposite that of self phase modulation, thereby substantially eliminating self phase modulation dispersion.

Such a waveguide fiber is disclosed and described in U.S. patent application Ser. No. 08/559,954, now U.S. Pat. No. 5,748,824. The present novel profile improves upon the 08/559,954 now U.S. Pat. No. 5,748,824 fiber by increasing effective area. In addition the waveguide of this disclosure has a total dispersion over the wavelength window of operation that is everywhere positive and has a lower limit greater than about 2.0 ps/nm-km to further reduce the power penalty due to four wave mixing.

Thus there is a need for an optical waveguide fiber which:
is single mode over at least the wavelength range 1530 nm to 1570 nm;
has a zero dispersion wavelength outside the range 1530 nm to 1570 nm;
has a positive total dispersion over the wavelength range 1530 nm to 1570 nm which is not less than about 2.0 ps/nm-km but yet is low enough to avoid a large linear dispersion power penalty;
has a usable transmission window in the range of about 1570 nm to 1625 nm; and
retains the usual high performance waveguide characteristics such as high strength, low attenuation and acceptable resistance to bend induced loss.

The concept of adding structure to the waveguide fiber core by means of core segments, having distinct profiles to provide flexibility in waveguide fiber design, is described fully in U.S. Pat. No. 4,715,679, Bhagavatula. The segmented core concept can be used to achieve unusual combinations of waveguide fiber properties, such as those described herein.

DEFINITIONS

The following definitions are in accord with common usage in the art.

The refractive index profile is the relationship between refractive index and waveguide fiber radius.

A segmented core is one that has at least a first and a second waveguide fiber core radius segment. Each radius segment has a respective refractive index profile.

The radii of the segments of the core are defined in terms of the beginning and end points of the segments of the refractive index profile. FIG. 1 illustrates the definitions of radius used herein. The radius of the center index segment 10, is the length 2 that extends from the waveguide centerline to the point at which the profile becomes the α-profile of segment 12, that is, the point selected to start the calculation of the relative index using the α-profile equation. The radius of segment 12 extends from the centerline to the radial point at which the extrapolated descending portion of the α-profile crosses the extrapolated extension of profile segment 14. The radius of segment 14 extends from the centerline to the radius point at which the Δ % is half the maximum value of the Δ % of segment 16. The width of segment 16 is measured between the half Δ % percent values of segment 16. The radius of segment 16 extends from the centerline to the midpoint of the segment.

It is clear that many alternative definitions of segment dimensions are available. The definitions set forth here were used in a computer model that predicts waveguide properties given a refractive index profile. The model can also be used to provide a family of refractive index profiles that will have a pre-selected set of functional properties.

The effective area is $$A_{eff} = 2\pi (\int E^2\ r\ dr)^2 / (\int E^4\ r\ dr),$$

where the integration limits are 0 to ∞, and E is the electric field associated with the propagated light. An effective diameter, $D_{eff}$, may be defined as, $$A_{eff} = \pi (D_{eff}/2)^2.$$

The profile volume is defined as $2\int_{r1}^{r2} \Delta\ \%\ r\ dr$. The inner profile volume extends from the waveguide centerline, r=0, to the crossover radius. The outer profile volume extends from the cross over radius to the last point of the core. The units of the profile volume are % $\mu m^2$ because relative index is dimensionless. The profile volume units, % $\mu m^2$, will be referred to simply as units throughout this document.

The crossover radius is found from the dependence of power distribution in the signal as signal wavelength changes. Over the inner volume, signal power decreases as wavelength increases. Over the outer volume, signal power increases as wavelength increases.

The initials WDM represent wavelength division multiplexing.

The initials SPM represent self phase modulation, a non-linear optical phenomenon wherein a signal having a power density above a specific power level will travel at a different speed in the waveguide relative to a signal below that power density. SPM causes signal dispersion comparable to that of linear dispersion having a negative sign.

The initials FWM represent four wave mixing, the phenomenon wherein two or more signals in a waveguide interfere to produce signals of different frequencies.

The term, $\Delta$ %, represents a relative measure of refractive index defined by the equation, $$\Delta\% = 100 \times (n_i^2 - n_c^2)/2n_i^2,$$

where $n_i$ is the maximum refractive index in region i, unless otherwise specified, and $n_c$ is the refractive index of the cladding region unless otherwise specified.

The term alpha profile, $\alpha$-profile refers to a refractive index profile, expressed in terms of $\Delta(b)$ %, where b is radius, which follows the equation, $$\Delta(b)\% = \Delta(b_o)(1 - [|b-b_o|/(b_1-b_o)]^\alpha),$$

where $b_o$ is the maximum point of the profile and $b_1$ is the point at which $\Delta(b)\%$ is zero and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number. The initial and final points of the $\alpha$-profile are selected and entered into the computer model. As used herein, if an $\alpha$-profile is preceded by a step index profile, the beginning point of the $\alpha$-profile is the intersection of the $\alpha$-profile and the step profile. Diffusion at this intersection is not taken into account in the model. Thus when assigning a beginning point of an $\alpha$-profile to a profile including diffusion, the $\alpha$-profile shape and the step index profile shape are extrapolated to find their intersection point. An ending point of an $\alpha$-profile for the case where the $\alpha$-profile is followed by a step index profile is found in an analogous manner.

In the model, in order to bring about a smooth joining of the $\alpha$-profile with the profile of the adjacent profile segment, the equation is rewritten as;

$$\Delta(b)\% = \Delta(b_a) + [\Delta(b_o) - \Delta(b_a)]\{(1 - [|b-b_o|/(b_1-b_o)]^\alpha\},$$

where $b_a$ is the first point of the adjacent segment.

The pin array bend test is used to compare relative resistance of waveguide fibers to bending. To perform this test, attenuation loss is measured when the waveguide fiber is arranged such that no induced bending loss occurs. This waveguide fiber is then woven about the pin array and attenuation again measured. The loss induced by bending is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins. During testing, the waveguide fiber is placed under a tension just sufficient to make the waveguide conform to a portion of the periphery of the pins.

SUMMARY OF THE INVENTION

The novel single mode waveguide fiber disclosed and described herein meets the requirements listed above and, in addition, lends itself to reproducible manufacture.

The novel single mode fiber has a segmented core of at least two segments, each segment characterized by a refractive index profile, a relative index $\Delta$ %, and a radius. The core segment characteristics are selected to provide a particular set of properties suited to a telecommunication system designed to operate in the 1550 nm window, typically in the range of about 1530 nm to 1570 nm. A preferred range has an operating wavelength window that extends to about 1625 nm. The system may include optical amplifiers, WDM operation, and relatively high signal amplitudes. To substantially eliminate non-linear effects, such as FWM and SPM, which occur in a high performance, high rate systems, the effective area of the waveguide is made to be greater than about 60 $\mu m^2$, more preferably greater than 65 $\mu m^2$, and most preferably greater than 70 $\mu m^2$. The total dispersion is preferably positive and equal to at least 2 ps/nm-km at 1530 nm. This total dispersion together with a total dispersion slope less than about 0.1 ps/nm$^2$-km insures a minimum FWM effect over the wavelength window. The mode field diameter over the wavelength band 1530 nm to 1570 nm and up to 1625 nm is large, in the range of about 8.8 $\mu m$ to 10.6 $\mu m$ to provide for ease in splicing the fibers. Fiber profiles have been made in accordance with the invention that exhibit an attenuation of less than 0.25 dB/km at both 1550 nm and 1625 nm.

In one embodiment of the novel waveguide fiber, in addition to each of the segments being characterized by a refractive index profile, a radial extent, and a positive relative index percent, at least one of the segments has an $\alpha$-profile. A clad glass layer surrounds and is in contact with the core.

Embodiments of the novel waveguide include, but are not limited to, those having two, three and four segments. The particular characteristics of these embodiments are set forth in the tables and examples which follow.

In the embodiment set illustrated in FIGS. 5 and 6, the novel waveguide fiber has an $\alpha$-profile in the range of about 0.8 to 3.3, and more preferably in the range of 0.95 to 3.16. The relative index $\Delta$ % is highest in the segment having an $\alpha$-profile shape, and is lowest over the step index shape adjoining the $\alpha$-profile. The outermost segment has a $\Delta$ % between that of the central and second segments.

Also included are embodiments that exhibit desired dispersion and mode field diameter at 1625 nm. In particular, at 1625 nm, the waveguide fiber has a total dispersion less than about 13 ps/nm-km and preferably less than about 11.5 ps/nm-km.

The present invention also relates to optical fiber preforms, and methods for making such optical fiber preforms, having a refractive index profile such that, when the optical fiber preform is drawn into a waveguide fiber, the waveguide fiber includes a segmented core having at least two segments, each of the segments having a radius $r_i$, a refractive index profile and a relative refractive index percent, $\Delta_i$ %, where i is equal to the number of segments and a clad layer surrounding and in contact with the core, the clad layer having a refractive index $n_c$; wherein, the $r_i$, $\Delta_i$ %, and the refractive index profiles result in fibers having the properties and characteristics as described further herein.

Such optical fiber preforms can be made using any of the known techniques in the art, including chemical vapor deposition techniques such as OVD, IV, MCVD, and VAD. In a preferred embodiment, a soot preform is made using an OVD technique having the desired refractive index profile. This soot preform is then consolidated and drawn into a waveguide fiber.

DETAILED DESCRIPTION OF THE INVENTION

The novel waveguide fiber comprises a family of segmented core designs that yield a very particular set of desired functional parameters. The family of core designs include, but are not limited to, embodiments having two, three, and four segments.

The desired characteristics include a dispersion zero wavelength lower than the operating window which lies in the range of about 1530 nm to 1570 nm, referred to as the C-band and may include wavelengths at about 1625 nm which is at the upper end of the L-band, which refers to a wavelength range of about 1570 nm to 1625 nm. The total dispersion is preferably not less than about 2 ps/nm-km in the operating window and the dispersion slope is low, less than about 0.10 ps/nm$^2$-km, to insure limited power penalty due to linear dispersion. The low slope provides for a total dispersion at 1625 nm not greater than about 13 ps/nm-km. Total dispersion at 1625 nm of less than 10 ps/nm-km has been achieved.

The non-zero total dispersion effectively eliminates FWM and the positive sign of the total dispersion offsets signal degradation due to SPM.

Tables 1, 2 and 3, set forth below define the novel family of waveguide fibers that have these properties. It will be noted in the examples that follow, that attenuation is quite low and bending induced loses are acceptable.

Figure 1:
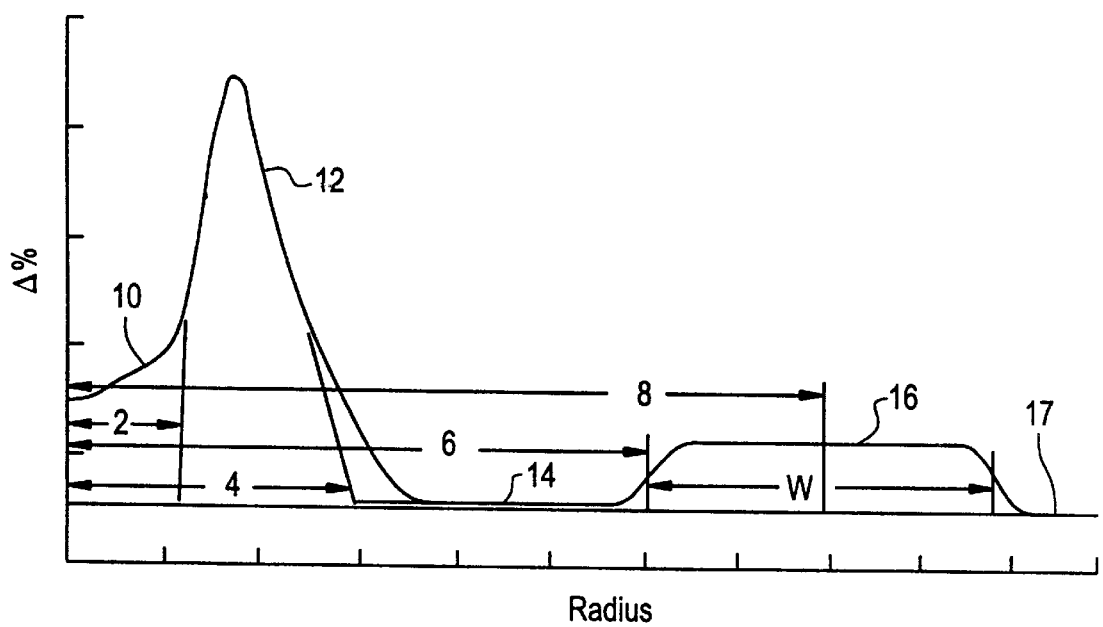
FIG. 1 illustrates a core profile in accord with the invention that shows the definitions of radii used in the computer model calculations.
Figure 2:
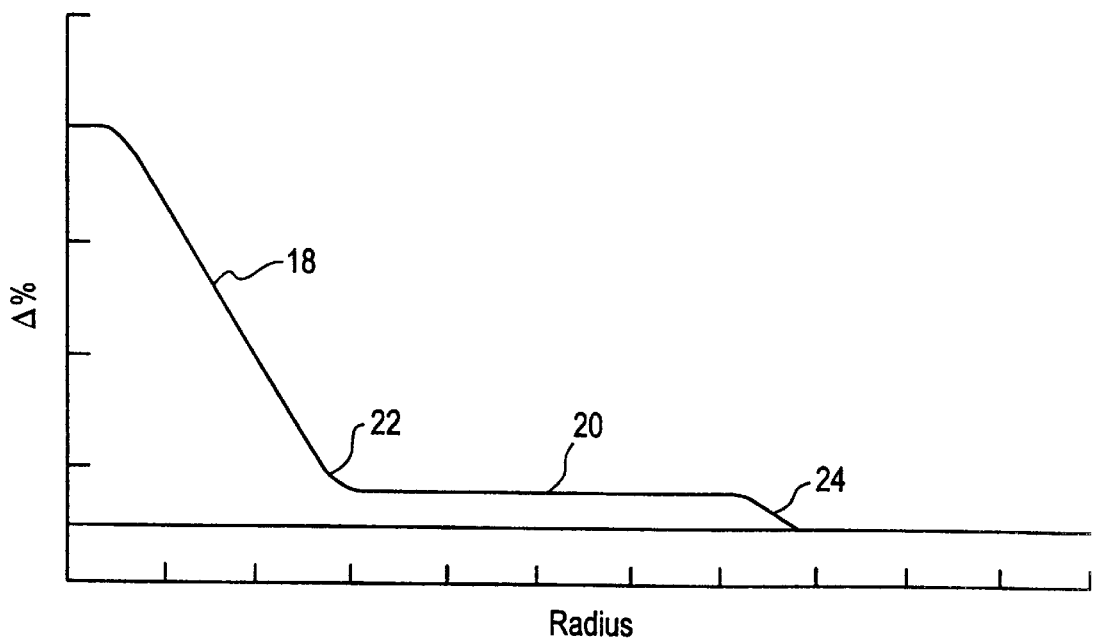
FIG. 2 is a chart of relative index percent vs. core radius illustrating a two segment embodiment.

Referring to FIG. 2, a chart of Δ % vs. core radius in microns, the segmented core is seen to have two segments. This is a special case of the waveguide fiber described in Table 1 below in which the second and third segments are of equal Δ %. Segment 18 is an alpha profile having an alpha of about 1. The second segment 20 is a step index profile, having an outer radius determined from the width and outer radius given in Table 2. This outer radius is the mid point radius defined above. It is drawn to the midpoint of the width of the third segment. Compensation has been made for centerline dopant diffusion by increasing the dopant flow rate during lay down of the center portion of the preform. The amount of the dopant increase is preferably determined empirically by adding different dopant amounts to the centerlines of several preforms then processing the preforms through to waveguide fiber. The curved portions 22 and 24 of the profile result from dopant diffusion. In general, the radii included in the model calculations do not take this diffusion into account, because the effect of diffusion such as that shown in FIG. 2 at profile portions 22 and 24 is small. In any case, the diffusion can be compensated by making adjustments to other portions of the refractive index profile.

EXAMPLE 1

Three Segment Profile

Figure 3:
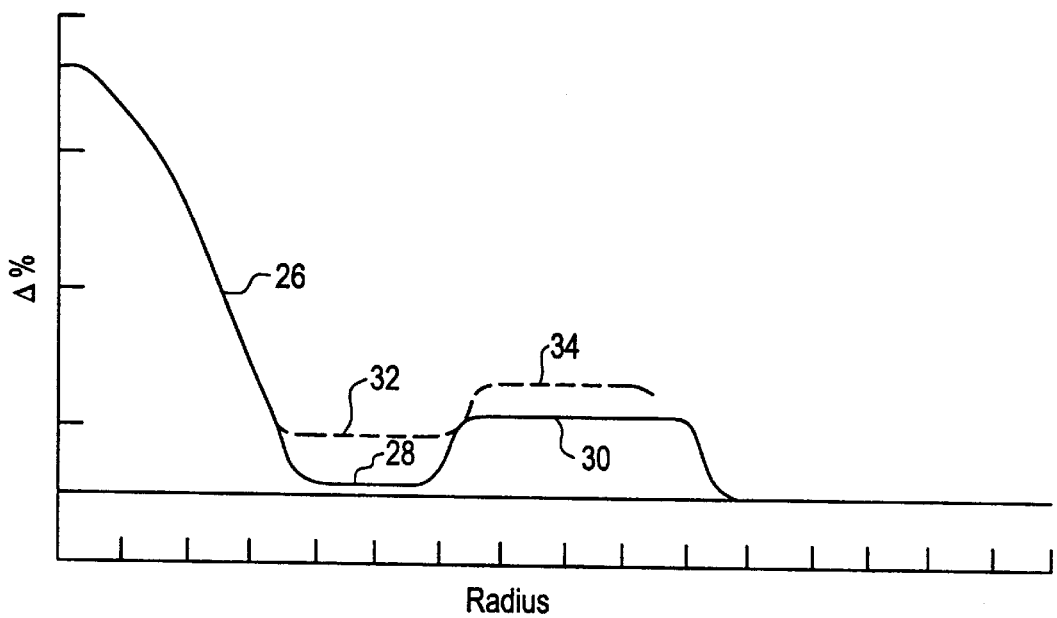
FIG. 3 is a chart of relative index percent vs. core radius illustrating a three segment embodiment.

A fiber was modeled in accord with FIG. 3 and had the following configuration. Counting the segments consecutively, beginning with 1 at the centerline, and using the definitions provided above, the core design was $\Delta_1\%$ about 0.70%, $r_1$ about 0.39 μm, $\Delta_2\%$ about 0.74, $r_2$ about 2.84 Δm, $\Delta_3\%$ about 0.05% and $r_3$, drawn from the centerline to the midpoint of the step 20, about 5.09 μm. The width of segment 3 was about 4.5 μm. The relative index percent on centerline was about 0.7 and extended to a radius of about 0.39 μm, at which point the α-profile began. The Δ is about 1.

This waveguide fiber had the predicted properties:

zero dispersion wavelength, $\lambda_o$, of 1501 μm;

total dispersion at 1540 nm of 3.11 ps/nm-km;

total dispersion at 1560 of 4.71 ps/nm-km;

total dispersion slope 0.08 ps/nm$^2$-km;

cut off wavelength, $\lambda_c$, 970 nm measured on the fiber;

effective area, $A_{eff}$, 72.7 μm$^2$; and, attenuation at 1550 nm of 0.196 dB/km. The pin array bend loss was 87 dB. A section of the waveguide was weighted laterally and the bend loss found to be 0.72 dB/m at 1550 nm.

EXAMPLE 2

Three Segment Profile

A second three segment core waveguide was modeled in accord with the refractive index profile shown in FIG. 3. In this case, the α-profile 26 began at the centerline and had $\Delta_1\%$ of 0.63, $r_1$ of 3.69 μm. The second segment 28 had a step profile and $\Delta_2\%$ of 0.018. The third segment 30 had a step profile and $\Delta_3\%$ of 0.12%, $r_3$, the mid point radius defined above, of 8.2 μm and a width of 4.23 μm.

This waveguide fiber had the predicted properties:

zero dispersion wavelength, $\lambda_o$, of 1495 μm;

total dispersion at 1540 nm of 3.37 ps/nm-km;

total dispersion at 1560 of 4.88 ps/nm-km;

total dispersion slope 0.075 ps/nm$^2$-km;

cut off wavelength, $\lambda_c$, 1648 nm measured on the fiber; and, effective area, $A_{eff}$, 72.8 μm$^2$. The pin array bend loss was 15.3 dB. A section of the waveguide was weighted laterally and the bend loss found to be 0.75 dB/m at 1550 nm.

In this case the properties are excellent and the bend loss is much improved over the design of example 1. Dashed lines 32 and 34 in FIG. 3 are included to illustrate alternative three segment core designs. It will be understood that the design of FIG. 3 includes index profiles where segments 28 and 30 deviate slightly from a step index configuration. For example the segments could have a small positive or negative slope. Although dopant diffusion is shown at the segment boundaries in FIG. 3, the model calculations did not include this diffusion. The same is true of all the model calculations contained herein.

EXAMPLE 3

Four Segment Profile

Figure 4:
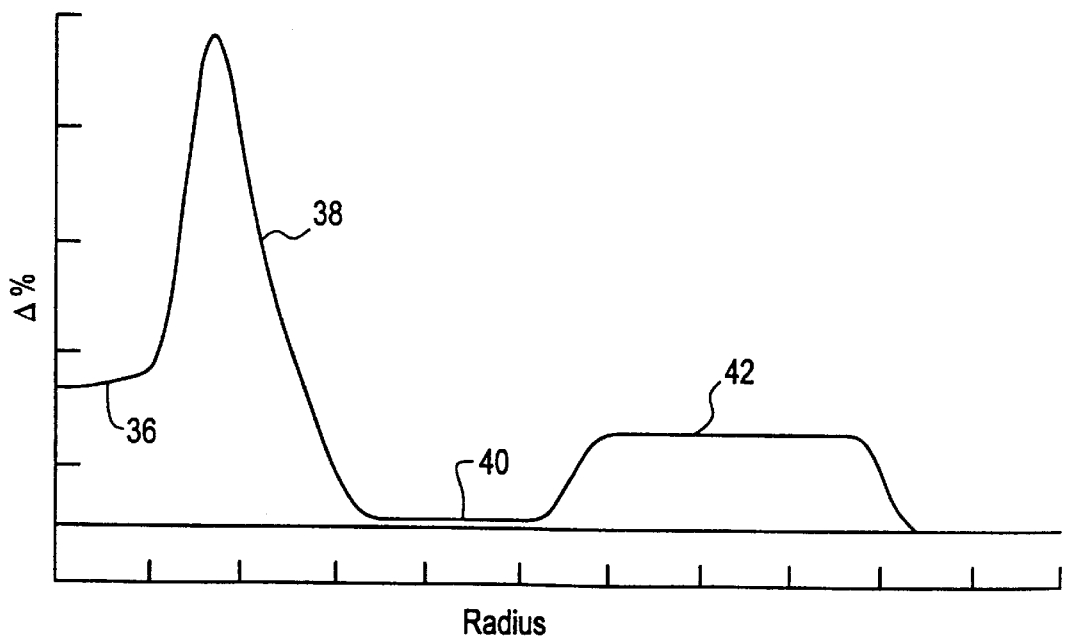
FIG. 4 is a chart of relative index percent vs. core radius illustrating a four segment embodiment.

A waveguide fiber having a profile in accord with FIG. 4 was modeled. The first segment 36 had a relative index on the centerline of 0.23, $\Delta_1$ of 0.28 at outer segment radius $r_1$, as defined above, which was 1.36 μm. The α-profile 38 had an α of 0.388, $\Delta_2\%$ of 1.73, and outer segment radius $r_2$ of 3.17 μm. The step index portion 40 had $\Delta_3\%$ of 0.17 and the step index portion 42 had $\Delta_4\%$ of 0.17, $r_4$ of 7.3 μm and a width of 3.50 μm.

This waveguide fiber had the predicted properties:

zero dispersion wavelength, $\lambda_o$, of 1496 μm;

total dispersion at 1540 nm of 3.47 ps/nm-km;

total dispersion at 1560 of 5.06 ps/nm-km;

total dispersion slope 0.08 ps/nm²-km;

cut off wavelength, $\lambda_c$, 1750 nm, measured on the fiber;

effective area, $A_{eff}$, 72.7 μm²; and, attenuation at 1550 nm, A1550, of 0.212 dB/km. The pin array bend loss was 6.16 dB. A section of the waveguide was weighted laterally and the bend loss found to be 0.74 dB/m at 1550 nm.

In this example the properties are again excellent and the bend resistance especially good.

The examples indicate a major tradeoff between the simplicity of the index profile vs. the bend resistance, with bend resistance improving as complexity of the profile increases.

To find the extent of parameter variation that could occur in the profile while still providing the desired properties, the model calculations were performed at a series of points in a space having an axis corresponding to each profile variable. Tables 1 through 3 illustrate preferred waveguide functional parameters in accordance with the invention that result in achievement of the desired properties. Parameters are illustrated Table 1 for a first three segment design, Table 2 for a second three segment design, and Table 3 for the four segment design. These tables set forth the waveguide fiber refractive index profile limits, i.e., limits on radii and relative index Δ %, as well as the properties which derive therefrom.

EXAMPLE 4

Three Segment Design

Figure 5:
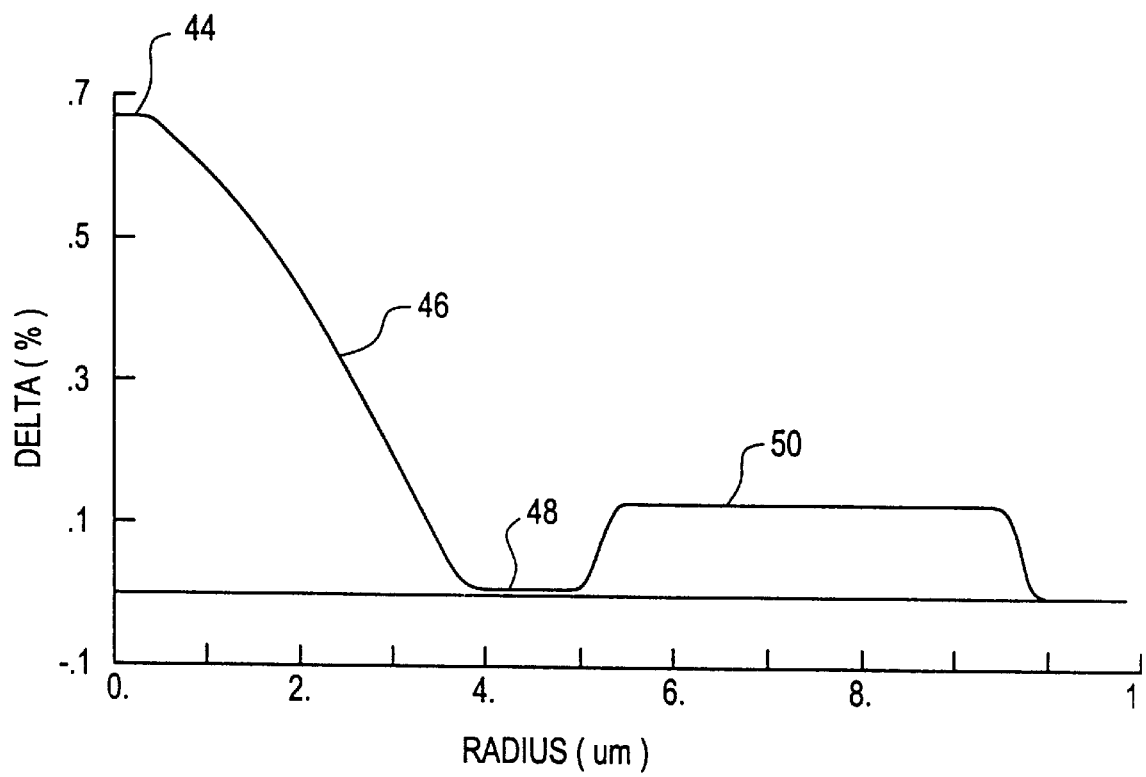
FIG. 5 is another example of relative index percent vs. core radius illustrating a three segment embodiment.

A further example of the three segment design which yielded excellent results was modeled. Referring to FIG. 5, segment 46, an α-profile with α of 1.33, has $\Delta_1\%$ of 0.64, $r_1$ of 3.72 μm, segment 48, a step index, has $\Delta_2\%$ of 0.008, $r_2$ of 4.5 μm, segment 50, a step index, has $\Delta_3\%$ of 0.14, midpoint radius $r_3$ is 7.43 μm and the width of segment 50 is 4.49 μm. The centerline diffusion compensation provided in segment 44 has a relative index on centerline of 0.7 which extended to a radius of 0.39 μm.

This waveguide fiber has the predicted properties:

zero dispersion wavelength, $\lambda_o$, of 1501 μm;

total dispersion at 1530 nm of 2.53 ps/nm-km;

total dispersion at 1565 of 5.47 ps/nm-km;

total dispersion slope 0.084 ps/nm²-km;

cut off wavelength, $\lambda_c$, 1280 nm, measured in cabled form;

effective area, $A_{eff}$, 72.5 μm²; and, attenuation at 1550 nm of 0.195 dB/km mode field diameter, 9.8 μm inner volume, 1.61 units, and, outer volume 4.90 units.

EXAMPLE 5

Manufacturing Results

Figure 6:
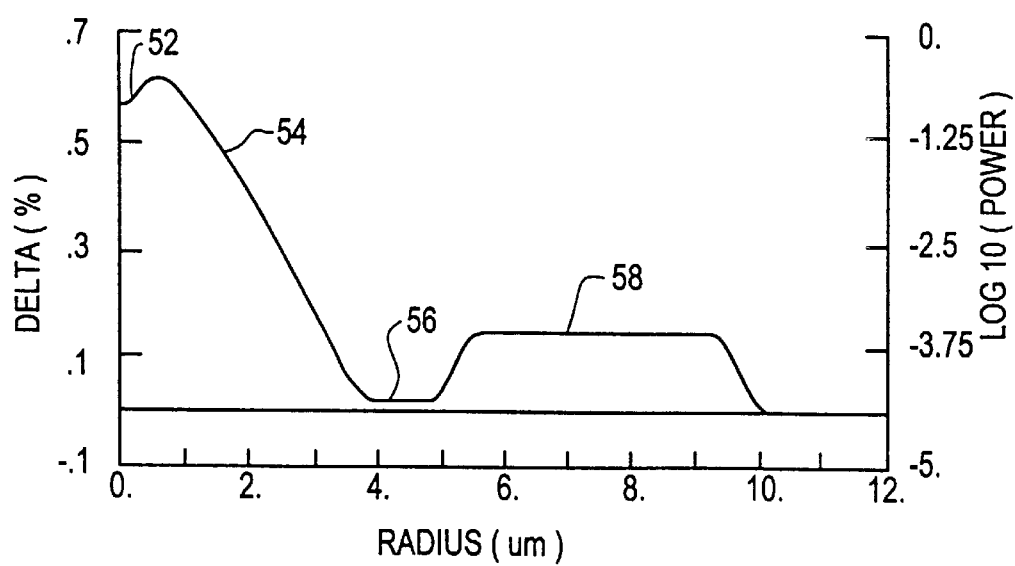
FIG. 6 is the relative index percent vs. core radius of an optical fiber made in accord with the target shape of FIG. 5.

A large number of fibers were manufactured in accord with the model profile of FIG. 5. The refractive index profile as measured is shown in FIG. 6. The target values of the fiber parameters were as follows. The indentation on centerline had a lowest Δ % of 0.55% and a radius of 0.39 μm. The α-profile had an α of 1.335, a Δ % of 0.64%, and a radius of 3.72 μm. The Δ % of the second segment was 0.008. The Δ % of the third segment was 0.137, the midpoint radius was 7.43, and the segment width was 4.49 μm. The average properties of the fibers was tabulated as follows.

| | |
|---|---|
| Dispersion at 1530 nm (ps/nm-km) | 2.603 |
| Dispersion at 1565 nm ( ps/nm-km) | 5.567 |
| Dispersion at 1625 nm (ps/nm-km) | 10.582 |
| MFD (um) | 9.73 |
| Aeff (um²) | 72 |
| Cabled cutoff (nm) | 1229 |
| Dispersion slope (ps/nm²-km) | 0.085 |
| Attenuation at 1550 nm (dB/km) | 0.197 |
| Attenuation at 1380 nm (dB/km) | 0.371 |
| Attenuation at 1310 nm (dB/km) | 0.345 |
| Lambda0 (nm) | 1499.4 |
| PMD (ps/sqrt-km) | 0.018 |

These are excellent results which meet or exceed the desired waveguide fiber properties. Attenuation at 1625 nm for this waveguide fiber were also less than 0.25 dB/km.

The following tables effectively define the family of refractive index profiles that yield the desired waveguide fiber function. Set forth are maximum and minimum Δ % of each particular segment, as well as corresponding radii $r_i$ for each segment. The cases in which the radius measurements are taken to the midpoint of a segment are labeled in the table heading. All other radii are the maximum outer radii of a given segment as well as the minimum inner radii of the next adjacent segment, where the segments are counted beginning at 1 on the center and proceeding outward. These other radii are measured to the extrapolated intersection between segment profiles. Width refers to the width of the segment whose radius is measured to its midpoint.

TABLE 1

|  | $\Delta_1$ | $r_1$ | $\Delta_2$ | $\Delta_3$ | $r_3$ midpoint radius |
|---|---|---|---|---|---|
| Maximum | 1.068 | 4.167 | 0.136 | 0.159 | 10.109 |
| Minimum | 0.712 | 2.441 | 0.000 | 0.060 | 3.945 |
|  | Width | Alpha | Inner Volume | Outer Volume | Volume Ratio |
| Maximum | 6.521 | 1.000 | 1.675 | 5.946 | 0.756 |
| Minimum | 3.098 | 1.000 | 1.213 | 1.654 | 0.256 |
|  | Lambda 0 | slope | Mode Field Diameter | Aeff | Cutoff |
| Maximum | 1512 | 0.091 | 10.23 | 79.3 | 1789 |
| Minimum | 1469 | 0.062 | 9.22 | 63.7 | 1079 |

TABLE 2

|  | $\Delta_1$ | $r_1$ | $\Delta_2$ | $\Delta_3$ | $r_3$ midpoint radius |
|---|---|---|---|---|---|
| Maximum | 0.833 | 3.820 | 0.091 | 0.284 | 10.247 |
| Minimum | 0.542 | 2.727 | 0.008 | 0.051 | 5.762 |
|  | Width | Alpha | Inner Volume | Outer Volume | Volume Ratio |
| Maximum | 9.317 | 3.158 | 1.841 | 6.099 | 0.698 |
| Minimum | 1.363 | 0.967 | 1.358 | 2.173 | 0.242 |
|  | Lambda 0 | slope | Mode Field Diameter | Aeff | Cutoff |
| Maximum | 1514.1 | 0.092 | 10.36 | 82 | 1799 |
| Minimum | 1465.4 | 0.061 | 9.17 | 63 | 1200 |

TABLE 3

|  | $\Delta_2$ | $r_2$ | $\Delta_3$ | $\Delta_4$ | $r_4$ midpoint radius |
|---|---|---|---|---|---|
| Maximum | 2.384 | 3.291 | 0.123 | 0.180 | 7.387 |
| Minimum | 1.683 | 2.249 | 0.000 | 0.058 | 5.289 |
|  | Width | Alpha | Inner Volume | Outer Volume | Volume Ratio |
| Maximum | 8.031 | 0.394 | 1.885 | 5.866 | 0.772 |
| Minimum | 3.377 | 0.218 | 1.274 | 2.050 | 0.245 |
|  | $\Delta$ on Center | $\Delta_1$ | $r_1$ |  |  |
| Maximum | 0.235 | 0.718 | 1.3865 |  |  |
| Minimum | 0.225 | 0.1154 | 1.1302 |  |  |
|  | Lambda 0 | slope | Mode Field Diameter | Aeff | Cutoff |
| Maximum | 1533.3 | 0.100 | 10.62 | 88.3 | 1787 |
| Minimum | 1465.8 | 0.069 | 8.83 | 59.4 | 1187 |

Although particular examples of the novel waveguide have been disclosed and described herein, the invention is nonetheless limited only by the following claims.

We claim:

1. A single mode optical waveguide fiber comprising:

a segmented core having at least two segments, each of the segments having a radius $r_i$, a refractive index profile and a positive relative refractive index percent, $\Delta_i$ %, where i is equal to the number of segments, and a clad layer surrounding and in contact with the core, the clad layer having a refractive index $n_c$;

wherein, the $r_i$, $\Delta_i$ %, and the refractive index profiles are selected to provide:

zero dispersion wavelength in the range of about 1465 nm to 1530 nm;

total dispersion at 1530 nm $\geq$ 2 ps/nm-km;

total dispersion slope <0.1 ps/nm$^2$-km over the wavelength range 1530 nm to 1570 nm;

effective area >60 $\mu$m$^2$; and, mode field diameter, over the wavelength range of 1530 nm to 1570 nm, in the range of about 8.8 $\mu$m to 10.6 $\mu$m.

2. The single mode optical fiber of claim 1 wherein the total dispersion at 1625 nm is no greater than about 13 ps/nm-km.

3. The single mode optical fiber of claim 1 wherein at least one of the segments has an $\alpha$-profile.

4. The single mode optical fiber of claim 1 wherein the core has a centerline and at least three segments, a first segment beginning at about the centerline and having an $\alpha$-profile with an $\alpha$ value of about 1, a second segment adjoining the first segment and having a step index profile, and a third segment adjoining the second segment and having a step index profile.

5. The single mode optical fiber of claim 4 wherein the first segment has a $\Delta_1$% in the range of about 0.7 to 1.07, a radius $r_1$ in the range of about 2.4 to 4.17 $\mu$m, the second segment has a $\Delta_2$% in the range of about 0.00 to 0.14%, and the third segment has a $\Delta_3$% in the range of about 0.06 to 0.16, a mid point radius $r_3$ in the range of about 3.95 to 10.11 $\mu$m and a width in the range of about 3.10 to 6.52 $\mu$m.

6. The single mode optical fiber of claim 4 wherein the inner volume of the core is in the range of about 1.21 units to 1.68 units, the outer volume is in the range of about 1.65 units to 5.95 units, and the ratio of inner volume to outer volume is in the range of about 0.25 to 0.76.

7. The single mode optical fiber of claim 1 wherein the core has a centerline and at least three segments, a first segment beginning at the centerline and having an $\alpha$-profile with an $\alpha$ value in the range of about 0.97 to 3.16, a second segment adjoining the first segment and having a step index profile, and a third segment adjoining the second segment and having a step index profile.

8. The single mode optical fiber of claim 7 wherein the inner volume of the core is in the range of about 1.36 units to 1.84 units, the outer volume is in the range of about 2.17 units to 6.10 units, and the ratio of inner volume to outer volume is in the range of about 0.24 to 0.70.

9. The single mode optical fiber of claim 7 wherein the first segment has a $\Delta_1$ % in the range of about 0.54 to 0.83, a radius $r_1$ in the range of about 2.73 to 3.82 $\mu$m, the second segment has a $\Delta_2$% in the range of about 0.08 to 0.14%, and the third segment has a $\Delta_3$% in the range of about 0.06 to 0.09, a mid point radius $r_3$ in the range of about 5.76 to 10.25 $\mu$m and a width in the range of about 1.36 to 9.32 $\mu$m.

10. The single mode optical fiber of claim 7 further including a relative index indentation on centerline, the indentation being no more than about 0.20 $\Delta$ % less than $\Delta_1$, and the radius of the indentation being no greater than about 0.4 $\mu$m.

11. The optical waveguide fiber of claim 8 or 9 wherein the total dispersion at 1625 nm is no greater than about 13 ps/nm-km.

12. The single mode optical fiber of claim 1 wherein the core has a centerline and four segments, a first segment beginning at the centerline and having an index profile which has a first delta value on the centerline and a second delta value at its radius, wherein the index profile is a curve, the curve being determined by an interpolation curve-fit based upon the first and second index delta value, a second segment adjoining the first segment and having an α-profile with an α value in the range of about 0.22 to 0.394, a third segment adjoining the second segment and having a step index profile, and a fourth segment adjoining the third segment and having a step index profile.

13. The single mode optical fiber of claim 12 wherein the inner volume of the core is in the range of about 1.27 units to 1.89 units, the outer volume is in the range of about 2.05 units to 5.87 units, and the ratio of inner volume to outer volume is in the range of about 0.25 to 0.77.

14. The single mode optical fiber of claim 12 wherein the first segment has a $\Delta_1$ % in the range of about 0.12 to 0.72 and a relative index on centerline in the range of about 0.23 to 0.24, a radius $r_1$ in the range of about 1.13 to 1.39 μm, the second segment has a $\Delta_2$% in the range of about 1.68 to 2.38%, a radius in the range of about 2.25 to 3.29 μm, the third segment has a $\Delta_3$% in the range of about 0.00 to 0.12, and, the fourth segment has a $\Delta_4$% in the range of about 0.06 to 0.18, a mid point radius $r_4$ in the range of about 5.29 to 7.39 μm and a width in the range of about 3.38 to 8.03 μm.

15. An optical waveguide fiber preform comprising:
a central core region having a refractive index profile, said core region surrounded by and in contact with a clad layer, wherein said optical fiber preform is drawn to form a waveguide fiber, said preform central core region profile being configured to provide a waveguide fiber including;
a segmented core having at least two segments, each of the segments having a radius $r_i$, a refractive index profile and a relative refractive index percent, $\Delta_i$ %, where i is equal to the number of segments wherein the $\Delta_i$ % are positive,
and a clad layer surrounding and in contact with the core, the clad layer having a refractive index $n_c$;
wherein, the $r_i$, $\Delta_i$ %, and the refractive index profiles are selected to provide:
zero dispersion wavelength in the range of about 1465 nm to 1530 nm;
total dispersion at 1530 nm $\geq$ 2 ps/nm-km;
total dispersion slope <0.1 ps/nm$^2$-km over the wavelength range 1530 nm to 1570 nm;
effective area >60 μm$^2$; and,
mode field diameter, over the wavelength range of 1530 nm to 1570 nm, in the range of about 8.8 μm to 10.6 μm.

16. The optical waveguide fiber preform of claim 15 wherein the total dispersion of the waveguide fiber at 1625 nm is no greater than about 13 ps/nm-km.

17. The optical waveguide fiber preform of claim 15 wherein at least one of the waveguide fiber segments has an α-profile.

18. The optical waveguide fiber preform of claim 15 wherein the waveguide fiber core has a centerline and at least three segments, a first segment beginning at about the centerline and having an α-profile with an α value of about 1, a second segment adjoining the first segment and having a step index profile, and a third segment adjoining the second segment and having a step index profile.

19. The optical waveguide fiber preform of claim 18 wherein the inner volume of the waveguide fiber core is in the range of about 1.21 units to 1.68 units, the outer volume is in the range of about 1.65 units to 5.95 units, and the ratio of inner volume to outer volume is in the range of about 0.25 to 0.76.

20. The optical waveguide fiber preform of claim 18 wherein the waveguide fiber core first segment has a $\Delta_1$% in the range of about 0.7 to 1.07, a radius $r_1$ in the range of about 2.4 to 4.17 μm, the second segment has a $\Delta_2$% in the range of about 0.00 to 0.14%, and the third segment has a $\Delta_3$% in the range of about 0.06 to 0.16, a mid point radius $r_3$ in the range of about 3.95 to 10.11 μm and a width in the range of about 3.10 to 6.52 μm.

21. The optical waveguide fiber preform of claim 15 wherein the waveguide fiber core has a centerline and at least three segments, a first segment beginning at the centerline and having an α-profile with an α value in the range of about 0.97 to 3.16, a second segment adjoining the first segment and having a step index profile, and a third segment adjoining the second segment and having a step index profile.

22. The optical waveguide fiber preform of claim 21 wherein the inner volume of the waveguide fiber core is in the range of about 1.36 units to 1.84 units, the outer volume is in the range of about 2.17 units to 6.10 units, and the ratio of inner volume to outer volume is in the range of about 0.24 to 0.70.

23. The optical waveguide fiber preform of claim 21 wherein the waveguide fiber first segment has a $\Delta_1$% in the range of about 0.54 to 0.83, a radius $r_1$ in the range of about 2.73 to 3.82 μm, the second segment has a $\Delta_2$% in the range of about 0.08 to 0.14%, and the third segment has a $\Delta_3$% in the range of about 0.06 to 0.09, a mid point radius $r_3$ in the range of about 5.76 to 10.25 μm and a width in the range of about 1.36 to 9.32 μm.

24. The optical waveguide fiber preform of claim 21 further including in the waveguide fiber a relative index indentation on centerline, the indentation being no more than about 0.20 $\Delta$ % less than $\Delta_1$, and the radius of the indentation being no greater than about 0.4 μm.

25. The optical waveguide fiber preform of claim 23 or 24 wherein the total dispersion of the waveguide fiber at 1625 nm is no greater than about 13 ps/nm-km.

26. The single mode optical fiber preform of claim 15 wherein the waveguide fiber core has a centerline and four segments, a first segment beginning at the centerline and having an index profile which has a first delta value on the centerline and a second delta value at its radius, wherein the index profile is a curve, the curve being determined by an interpolation curve-fit based upon the first and second index delta value, a second segment adjoining the first segment and having an α-profile with an α value in the range of about 0.22 to 0.394, a third segment adjoining the second segment and having a step index profile, and a fourth segment adjoining the third segment and having a step index profile.

27. The single mode optical fiber preform of claim 26 wherein the inner volume of the waveguide fiber core is in the range of about 1.27 units to 1.89 units, the outer volume is in the range of about 2.05 units to 5.87 units, and the ratio of inner volume to outer volume is in the range of about 0.25 to 0.77.

28. The single mode optical fiber preform of claim 26 wherein the waveguide fiber first segment has a $\Delta_1$% in the range of about 0.12 to 0.72 and a relative index on centerline in the range of about 0.23 to 0.24, a radius $r_1$ in the range of about 1.13 to 1.39 μm, the second segment has a $\Delta_2$% in the range of about 1.68 to 2.38%, a radius in the range of about 2.25 to 3.29 μm, the third segment has a $\Delta_3$% in the range of about 0.00 to 0.12, and, the fourth segment has a $\Delta_4$% in the range of about 0.06 to 0.18, a mid point radius $r_4$ in the range of about 5.29 to 7.39 μm and a width in the range of about 3.38 to 8.03 μm.

* * * * *

UNITED STATES PATENT AND TRADEMARK OFFICE
CERTIFICATE OF CORRECTION

PATENT NO.    : 6,212,322 B1                                                   Page 1 of 1
DATED         : April 3, 2001
INVENTOR(S)   : Daiping Ma, David Kinney Smith It is certified that error appears in the above-identified patent and that said Letters Patent is hereby corrected as shown below:

Column 10,
Line 60, "8 or 9", should be -- 9 or 10 --

Column 11,
Line 33, "wherein" should be -- where --

Signed and Sealed this

Twenty-fifth Day of December, 2001

Attest:

JAMES E. ROGAN
Attesting Officer         Director of the United States Patent and Trademark Office

UNITED STATES PATENT AND TRADEMARK OFFICE
CERTIFICATE OF CORRECTION

PATENT NO.    : 6,212,322 B1
DATED         : April 3, 2001
INVENTOR(S)   : Daiping Ma and David Kinney Smith Page 1 of 1

It is certified that error appears in the above-identified patent and that said Letters Patent is hereby corrected as shown below:

<u>Title page,</u>
Item [56], References Cited, under FOREIGN PATENT DOCUMENTS, "0 799 524" should be -- 0 779 524 --

Signed and Sealed this

Sixth Day of August, 2002

*Attest:*

*Attesting Officer*

JAMES E. ROGAN
*Director of the United States Patent and Trademark Office*